United States Patent [19]
Berkowitz et al.

[11] 4,013,757
[45] Mar. 22, 1977

[54] HIGH PRESSURE THERMAL HYDROLYSIS PROCESS TO DECOMPOSE TRIAZINES IN ACID WASTE STREAMS

[75] Inventors: Sidney Berkowitz, Highland Park; Charles V. Juelke, Belle Meade, both of N.J.

[73] Assignee: FMC Corporation, Philadelphia, Pa.

[22] Filed: Apr. 17, 1975

[21] Appl. No.: 569,019

[52] U.S. Cl. .............................. 423/358; 210/59; 210/71; 423/365

[51] Int. Cl.$^2$ .......................................... C01C 1/08

[58] Field of Search ............... 260/248 A; 423/358, 423/437, 413, 365; 210/59, 71

[56] References Cited

UNITED STATES PATENTS

| 2,768,167 | 10/1956 | Marzluff et al. | 260/248 A |
| 3,154,545 | 10/1964 | Symes et al. | 260/248 A |
| 3,325,493 | 6/1967 | Shimaura et al. | 260/248 A |
| 3,878,208 | 4/1975 | Carlson et al. | 260/248 A |
| 3,969,352 | 7/1976 | Berkowitz | 260/248 A |

FOREIGN PATENTS OR APPLICATIONS

| 983,591 | 10/1965 | United Kingdom | 423/437 |
| 345,130 | 4/1972 | U.S.S.R. | 423/358 |

*Primary Examiner*—O. R. Vertiz
*Assistant Examiner*—Eugene T. Wheelock
*Attorney, Agent, or Firm*—C. M. Miles; E. G. Seems; P. Newman

[57] ABSTRACT

A high pressure thermal hydrolysis process is described which comprises heating acid waste streams resulting from the manufacture of cyanuric acid and chlorinated derivatives of cyanuric acid, containing cyanuric acid and amino-substituted cyanurates, in a pressure vessel, at a temperature of from about 225° to about 275° C, to effect decomposition of these materials into ammonia and carbon dioxide. This process provides an effective pollution control means, compatible with existing commercial facilities.

3 Claims, No Drawings

HIGH PRESSURE THERMAL HYDROLYSIS PROCESS TO DECOMPOSE TRIAZINES IN ACID WASTE STREAMS

This invention relates to a high pressure thermal hydrolysis process which effects fast and efficient decomposition of cyanuric acid and amino-substituted triazines contained in acid waste streams from the production of cyanuric acid and chlorinated derivatives of cyanuric acid.

Cyanuric acid and chlorinated derivatives of cyanuric acid are commercially produced in multi-million pound quantities. Dichloroisocyanuric acid and trichloroisocyanuric acid and alkali metal salts of dichloroisocyanuric acid are well known as a source of active chlorine. They are widely used to treat water supplies to prevent the growth of pathogenic bacteria and are used in detergent, bleaching, and sanitizing compositions. Acid waste streams from plants producing these materials contain cyanuric acid and on occasion, dissolved amino-substituted triazines, namely, ammeline, ammelide and melamine. During upset conditions, undissolved cyanuric acid may be present in the waste streams.

Specific examples of waste streams involved are the acid digester waste stream and hydrogen peroxide treated waste streams.

The acid digester waste stream is the largest source of carbonaceous and nitrogenous pollutants. This stream results from the purification of crude cyanuric acid by hydrolysis with an acid, as for example, sulfuric acid. Crude cyanuric acid contains approximately 80% cyanuric acid and approximately 20% amino-subsituted triazines. Amino-substituted triazines are hydrolyzed to cyanuric acid, most of which is recovered by filtration. The waste filtrate has a pH of from about 0 to about 3 and contains from about 0.2% to about 2% by weight cyanuric acid as well as up to 2.5% by weight unhydrolyzed aminosubstituted triazines.

Hydrogen peroxide treated waste streams result when hydrogen peroxide is employed to treat waste chlorination liquors resulting from the production of dichloroisocyanuric acid, trichloroisocyanuric acid, and alkali metal salts of dichloroisocyanuric acid. (U.S. application Ser. No. 425,167, filed in the name of Ronald H. Carlson, et al. on Dec. 14, 1973, now U.S. Pat. No. 3,878,208). Upon treatment with hydrogen peroxide, dechlorination results and most of the cyanuric acid is recovered by filtration. The remaining waste filtrate has a pH of from about 0.5 to about 3, when cyanuric acid is to be recovered, or from about 6 to about 10, when alkali metal salts of cyanuric acid are to be recovered. In most instances, the acid range is selected and the waste filtrate contains from about 0.03% by weight to about 0.05% by weight of dissolved cyanuric acid.

The various waste streams containing cyanuric acid and amino-substituted triazines may be combined for disposal, and in view of the relatively large amount of acid digester waste stream any combined stream requiring disposal will be an acid stream having a pH of from about 0 to about 6. In addition, during upset conditions, the combined waste stream may be a slurry containing up to 25% by weight of cyanuric acid. Such slurries result from spills of cyanuric acid occurring outside the line during the manufacture of cyanuric acid, which spills are flushed into the waste effluent.

Various methods are known in the art for decomposing cyanuric acid and amino-substituted triazines. It is known, for example, that nitrification of the ring nitrogen in cyanuric acid and in the amino-substituted triazines is effected by the action of certain bacteria. Biological degradation of cyanuric acid, while complete, requires a minimum of 6 to 9 weeks. The amino-substituted triazines are not completely degraded even after 15 weeks. (Nitrification Characteristics of Urea Pyrolyzates, Cyanurates, Melamine, and Related Compounds. K. G. Clark, J. Y. Yee, and T. G. Lamont, Fertilizer and Agricultural Lime Section, Soil and Water Conservation Research Division, Agricultural Research Service, U.S. Department of Agriculture, Beltsville, Maryland.)

It is also known that cyanuric acid and amino-substituted triazines present in aqueous waste streams from melamine production plants can be hydrolyzed to ammonia and carbon dioxide in alkaline solution at temperatures up to 200° C. (V. M. Karlike et al, Kinetics of Melamine Hydrolysis, Khim Prom (Moscow) 1971, 47 (10) 784–5; USSR Pat. No. 345,103, publication date July 14, 1972). According to the process described in this patent, waste streams containing 1 to 2 grams per liter of cyanuric acid and amino-substituted triazines may be treated with alkali at a temperature of from 120° to 200° C, under autogenous pressure, to effect almost complete hydrolysis of the cyanuric acid and amino-substituted triazines to form ammonia and carbon dioxide.

It is further known that amino-substituted triazines will undergo hydrolysis in acid media to produce cyanuric acid. (U.S. Pat. No. 2,768,167). This patent describes a high pressure thermal hydrolysis process for making cyanuric acid from the amino-substituted triazines, ammeline, ammelide and melamine. The process involves heating amino-substituted triazines in sulfuric acid to temperatures of at least 175° to 200° C. The patent further states that higher temperatures may be used but the additional advantages thereby gained are usually offset by the increased expense.

Environmental considerations make it imperative that plant effluents are produced which are substantially reduced in nitrogenous and carbonaceous pollutants. A process is, therefore, needed which will effectively and efficiently remove cyanuric acid and amino-substituted triazines from such acid waste streams.

A process has been unexpectedly discovered that results in effective high pressure thermal hydrolysis of acid waste streams containing a compound selected from the group consisting of cyanuric acid, melamine, ammeline and ammelide, said waste streams having a pH of from about 0 to about 6, which process comprises:

a. heating said waste streams in a pressure vessel at a temperature of from about 225° to about 275° C under the autogenously developed pressure; and b. continuing said heating for from about one minute to about 15 minutes, until said compound has been hydrolyzed into ammonia and carbon dioxide.

It is most unexpected that at temperatures above about 225° C complete hydrolysis of cyanuric acid and amino-substituted triazines present in acid waste streams, can be effected in a matter of minutes. This effect is especially surprising in view of the large amounts of cyanuric acid, that is, up to about 25% by weight of cyanuric acid in said acid waste streams, which can be hydrolyzed by the inventive process in such a short time.

The present invention can be carried out on aqueous waste streams having a pH from about 0 to about 6.

The waste stream to be treated is passed into a pressure vessel, capable of handling 1 to 30 atmospheres of pressure. The pressure used is the autogenous pressure resulting from the operating temperature selected and the amount of the materials to be hydrolyzed.

The temperature employed can range from about 225° to about 275° C. The preferred range is from about 245° to 275° C. At these temperatures, complete hydrolysis can be effected in from about 1 to about 15 minutes, and in most instances is effected in from about 1 to about 5 minutes. The time required for complete hydrolysis depends more on the selected temperature than the concentration of cyanuric acid in the waste stream to be hydrolyzed. Where a higher concentration of substituted triazines, as melamine, ammeline, and ammelide is present, a higher temperature may be desired as compared to that selected for hydrolysis of waste streams not containing these materials.

This process can effect complete hydrolysis of cyanuric acid and slurries containing up to 25% by weight of cyanuric acid to produce ammonia and carbon dioxide. In acid media, the ammonia produces ammonium salts with the acid present, as for example, ammonium bisulfate and ammonium sulfate. These salts may be recovered by conventional crystallization methods. The carbon dioxide produced is evolved as a gas.

If desired, the hydrolyzed effluent may be treated with caustic, such as sodium hydroxide, to produce ammonia and sodium carbonate. The ammonia may be purged from the effluent with, for example, a stream of an inert gas or steam. The sodium carbonate may be recovered by conventional crystallization methods.

The following examples are included by way of illustration of the present invention and are not deemed limitative thereof.

EXAMPLE I

A sample of acid digester aqueous waste stream was obtained from a commercial installation for the manufacture of cyanuric acid. Analysis of this waste stream showed that it contained 20.1% by weight sulfuric acid, 0.27% by weight cyanuric acid, 0.49% by weight ammelide, 0.13% by weight ammeline, and 4.1% by weight ammonium bisulfate. The pH of this stream was 0.5.

A 300 ml Hastelloy B autoclave was charged with 150 ml of this waste stream. The autoclave was sealed and heated with shaking to 250° C. The reaction mass was maintained at this temperature for 1 minute and then allowed to cool slowly to room temperature. The pressure employed was the autogenous pressure, and was recorded at 620 psig.

The hydrolyzed stream was analyzed to determine the presence of cyanuric acid and amino-substituted triazines.

The melamine precipitation method used to analyze for cyanuric acid, showed a complete absence of cyanuric acid. This method involves the addition of a dilute solution of melamine to form an insoluble cyanuric acid-melamine complex, from which the amount of cyanuric acid present is gravimetrically determined. The hydrolyzed stream was further analyzed by means of ultraviolet spectroscopy to determine the presence of amino-substituted triazines. Lack of absorption in the region 200–250 nanometers indicated that no triazine ring structure remained.

EXAMPLE II

Four separate 20% slurries of cyanuric acid in distilled water (that is, 1 gram of cyanuric acid per four grams of water) were prepared, which slurries had a pH of 4.3.

A 300 ml Hastelloy B autoclave was individually charged in four runs with 150 ml of each of the above described slurries. The autoclave was sealed and heated with shaking to one of four selected temperatures, namely, 190° C, 200° C, 225° C and 250° C. Each reaction mass was maintained at the selected temperature for 1 minute and then allowed to cool slowly to room temperature. The pressures employed were the autogenous pressures and were recorded at 150, 200, 415 and 900 psig, respectively.

The amounts of cyanuric acid remaining in the hydrolyzed streams were determined by the melamine precipitation method. Results set forth in Table 1, show that at a temperature of 250° C, no cyanuric acid remained in the hydrolyzed stream.

EXAMPLE III

Four separate 20% slurries of cyanuric acid in 20% phosphoric acid, (that is, one gram of cyanuric acid per four grams of 20% phosphoric acid), were prepared, which slurries had a pH of 0.7.

The hydrolysis procedure followed was identical to that described for Example II. The autogenous pressures corresponding to the temperatures 190° C, 200° C, 225° C, and 250° C, were recorded as 150, 200, 415, and 900 psig, respectively.

The amounts of cyanuric acid remaining in the hydrolyzed stream were determined by the melamine precipitation method. The results set forth in Table II show that at a temperature of 250° C no cyanuric acid remained in the hydrolyzed stream.

EXAMPLE IV

A 20% slurry of crude cyanuric acid, (assay 80% cyanuric acid, 18% ammelide, 2% ammeline), in 20% phosphoric acid (one gram of crude cyanuric acid per four grams of 20% phosphoric acid), was prepared, which slurry had a pH of 0.5.

Hydrolysis was carried out at 250° C, following the procedure described above for Example II. The autogenous pressure was recorded at 900 psig.

Analysis of the hydrolyzed stream for cyanuric acid by the melamine precipitation method, and for triazine ring structure by ultraviolet spectroscopy, indicated the complete absence of cyanuric acid and amino-substituted triazines.

EXAMPLE V

A simulated hydrogen peroxide treated waste stream was prepared by dissolving 320 grams of sodium chloride and 4.5 grams of sodium sulfate in 3,416.9 grams of distilled water. 22.9 grams of cyanuric acid were added to the solution and the mixture was stirred for one hour. 7.1 grams of sodium hydroxide and 150 grams of distilled water were then added to the mixture. The resulting slurry was stirred for 6 hours, allowed to stand overnight, and the solids were removed by filtration. Analysis of the filtrate by the melamine precipitation method showed that it contained 0.05% by weight cyanuric acid. The initial pH of this solution, 7.3, was adjusted to 4.2 by the addition of hydrochloric acid.

A 300 ml Hastelloy B autoclave was charged with 150 ml of this simulated waste stream. The autoclave was sealed and heated with shaking to 275° C. The reaction mass was maintained at this temperature for one minute and then allowed to cool slowly to room temperature. The autogenous pressure was recorded at 750 psig.

The melamine precipitation method showed a complete absence of cyanuric acid in the hydrolyzed stream.

The invention being thus described, it will be obvious that the same may be varied in many ways, such variations are not to be regarded as a departure from the spirit and scope of the invention, and all such modifications are intended to be included within the scope of the following claims.

TABLE I

DECOMPOSITION OF 20% SLURRIES OF CYANURIC ACID IN WATER

| Run No. | Temp. ° C | % Cyanuric Acid Decomposed in 1 Min. |
|---|---|---|
| 1 | 190 | 0.8 |
| 2 | 200 | 3.2 |
| 3 | 225 | 28.5 |
| 4 | 250 | 100.0 |

TABLE II

DECOMPOSITION OF 20% SLURRIES OF CYANURIC ACID IN 20% PHOSPHORIC ACID

| Run No. | Temp. ° C | % Cyanuric Acid Decomposed in 1 min. |
|---|---|---|
| 5 | 190 | 0.2 |
| 6 | 200 | 0.9 |
| 7 | 225 | 12.0 |
| 8 | 250 | 100.0 |

What is claimed is:

1. A process for treating an acid waste stream having a pH of from about 0 to about 6 and containing a triazine ring compound selected from the group consisting of cyanuric acid, melamine, ammeline and ammelide, to effect decomposition of said triazine ring compound into the decomposition products ammonia and carbon dioxide, which comprises heating said acid waste stream at a temperature of from about 225° to about 275° C under the autogenously developed pressure for a time of from about one to about 15 minutes, until decomposition of said triazine ring compound into said decomposition products is effected, and recovering a waste stream having no detectable amount of said triazine ring compound.

2. The process of claim 1, wherein the temperature selected for heating said waste streams is from about 245° to about 275° C.

3. The process of claim 1, wherein the time for heating said waste streams at the selected temperature is from about 1 minute to about 5 minutes.

* * * * *

UNITED STATES PATENT AND TRADEMARK OFFICE
CERTIFICATE OF CORRECTION

PATENT NO. : 4,013,757
DATED : Mar. 22, 1977
INVENTOR(S) : SIDNEY BERKOWITZ and CHARLES V. JUELKE It is certified that error appears in the above-identified patent and that said Letters Patent are hereby corrected as shown below:

Title page, second column, Foreign Patents or Applications, second line, "345,130" should read --345,103--.

Signed and Sealed this

Third Day of July 1979

[SEAL]

Attest:

Attesting Officer

LUTRELLE F. PARKER
Acting Commissioner of Patents and Trademarks